(12) United States Patent
Komatsu et al.

(10) Patent No.: US 9,725,090 B2
(45) Date of Patent: Aug. 8, 2017

(54) SPEED CONTROL FOR WORKING VEHICLE

(71) Applicant: KUBOTA CORPORATION, Osaka (JP)

(72) Inventors: Shigeru Komatsu, Osaka (JP); Keiji Takahashi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/806,021

(22) Filed: Jul. 22, 2015

(65) Prior Publication Data
US 2016/0031443 A1 Feb. 4, 2016

(30) Foreign Application Priority Data
Aug. 1, 2014 (JP) .................................. 2014-157699

(51) Int. Cl.
*B60W 30/14* (2006.01)
*B60W 10/06* (2006.01)
*B60W 10/101* (2012.01)

(52) U.S. Cl.
CPC .......... *B60W 30/143* (2013.01); *B60W 10/06* (2013.01); *B60W 10/101* (2013.01); *B60W 2300/152* (2013.01)

(58) Field of Classification Search
CPC ......... B60W 30/14; B60W 2710/0661; B60W 2710/18
USPC ......................................................... 701/93
See application file for complete search history.

(56) References Cited

U.S. PATENT DOCUMENTS

| | | | | |
|---|---|---|---|---|
| 2010/0059300 | A1* | 3/2010 | Brown | B60L 15/20 180/65.285 |
| 2011/0178684 | A1* | 7/2011 | Umemoto | F16H 61/421 701/51 |
| 2011/0297462 | A1* | 12/2011 | Grajkowski | B60K 26/04 180/54.1 |
| 2013/0030667 | A1* | 1/2013 | Fujimoto | B60W 10/06 701/93 |
| 2015/0329116 | A1* | 11/2015 | Bulgrien | B60W 10/11 192/219.4 |

FOREIGN PATENT DOCUMENTS

| | | |
|---|---|---|
| JP | 2009-270607 | 11/2009 |
| JP | 2012-040944 | 3/2012 |

* cited by examiner

*Primary Examiner* — Redhwan K Mawari
*Assistant Examiner* — Anshul Sood
(74) *Attorney, Agent, or Firm* — Greenblum & Bernstein, P.L.C.

(57) ABSTRACT

A speed control device in a traveling work vehicle changes a speed of rotational drive power from an engine to drive vehicle wheels and includes: a target speed calculator determining a target speed, based on operation deflection of a speed change device. A vehicle speed controller adjusting a speed change ratio based on the target speed. A vehicle speed obtainer obtaining an actual vehicle speed. A forcible target speed modifier forcibly modifying the target speed to a lower speed based on operation of a braking device. A release can treat an operation of the speed change device as a trigger to cancel the target speed forcibly modified by the forcible target speed modifier, and conforming the target speed to the actual vehicle speed.

18 Claims, 7 Drawing Sheets

Fig. 7

SPEED CONTROL FOR WORKING VEHICLE

CROSS-REFERENCE TO RELATED APPLICATIONS

The present application claims priority under 35 U.S.C. §119 of Japanese Application No. 2014-157699, filed on Aug. 1, 2014, the disclosure of which is expressly incorporated by reference herein in its entirety.

BACKGROUND OF THE INVENTION

1. Field of the Invention

The present invention relates to a speed control device in a traveling work vehicle, the speed control device changing a speed of rotational drive power from an engine via a continuously variable transmission mechanism to drive vehicle wheels.

2. Description of Related Art

A tractor is disclosed in Japanese Patent Laid-open Publication No. 2012-40944 in which is installed a transmission having a continuously variable transmission mechanism that combines a hydrostatic continuously variable transmission mechanism and a planetary gear drive train mechanism. In this tractor, travel speed is adjusted by pivoting a speed change lever provided to a front portion of an armrest in a front/back direction.

A tractor disclosed in Japanese Patent Laid-open Publication No. 2009-270607 includes a swash plate-type hydrostatic continuously variable transmission mechanism; a speed change pedal adjusting a swash plate position of the hydrostatic continuously variable transmission mechanism; and a brake pedal imparting a braking force to the tractor. When the brake pedal is stepped on, the speed change pedal is forcibly operated to a position where the swash plate is in neutral. The tractor has favorable braking ability due to the braking force from the brake pedal and an interruption in drive power due to putting the hydrostatic continuously variable transmission mechanism into neutral.

SUMMARY OF THE INVENTION

Braking ability is improved accompanying operation of a brake pedal by putting a continuously variable transmission mechanism into neutral. However, in a case where a driver's intent when braking is not to stop a vehicle but instead to reduce a speed of the vehicle to a desired speed, the continuously variable transmission mechanism that has been put into neutral must once again accelerate to a desired speed change status. Accordingly, in the conventional art noted above, an operation reducing speed to a desired speed cannot be performed smoothly. The present invention provides a speed control device in which speed reduction control to a desired speed via braking and a modification of a speed change ratio is performed so as to align as much as possible with a driver's sensations.

According to the present invention, a speed control device in a traveling work vehicle changes a speed of rotational drive power from an engine via a continuously variable transmission mechanism to drive vehicle wheels and includes a speed change device, a maximum speed definer, a target speed calculator, a vehicle speed controller, a vehicle speed obtainer, a braking device, a forcible target speed modifier, and a release. The maximum speed definer defines a maximum speed of the traveling work vehicle. The target speed calculator determines a target speed, based on operation deflection of the speed change device, by calculating a speed ratio relative to the maximum speed defined by the maximum speed definer. The vehicle speed controller adjusts one or both of a number of engine revolutions and a speed change ratio of the continuously variable transmission mechanism based on the target speed. The vehicle speed obtainer obtains an actual speed of the traveling work vehicle. The braking device performs an operation to brake the traveling work vehicle. The forcible target speed modifier forcibly modifies the target speed to a lower speed based on operation deflection of the braking device. The release treats an operation of the speed change device as a trigger to cancel the target speed forcibly modified by the forcible target speed modifier, and conforms the target speed to the actual vehicle speed.

When the work vehicle travels so as to match the target speed (vehicle speed) selected by the speed change device within a range of speed defined by the maximum speed, a need frequently arises during work travel to travel at a speed slower than the current speed (actual speed). In such a case, according to the above-described configuration, the braking device is operated and the vehicle is decelerated by a braking force based on the operation deflection. Simultaneously with this, the target speed is forcibly modified toward a reduced speed (for example, zero speed), and the continuously variable transmission mechanism is set to a reduced speed change ratio (for example, neutral). The vehicle decelerates smoothly via a reduction (interruption) of drive power due to the braking force from the braking device and a command to the continuously variable transmission mechanism to reduce the target speed (i.e., a modification of the speed change ratio toward a reduced speed (or neutral)). When a driver determines that the vehicle speed is in a low speed region, the driver operates the speed change device to obtain the desired speed. At this point, operation of the speed change device is treated as a trigger, and the target speed is set to a speed corresponding to the actual vehicle speed. Therefore, in the end, a desired lower speed is set by only slightly adjusting the speed change device. In this way, deceleration that aligns with a driver's sensations can be obtained with the speed change control device according to the present invention.

In the case of the traveling work vehicle, there is a significant difference in speed ranges, and in particular higher-end speeds, used during road travel, in which the vehicle travels on public roads or the like, and during work travel in a work field such as an agricultural field. Therefore, when a different maximum speed is defined for each of the road travel and the work travel, setting the speed using the speed change device can be performed effectively. Therefore, in another aspect of the present invention, a work travel mode maximum speed and a road travel mode maximum speed having a higher speed than the work travel mode maximum speed are provided as maximum speeds, and the work travel mode maximum speed is defined in the work travel mode, whereas the road travel mode maximum speed is defined in the road travel mode.

Even when the driver can easily determine whether the vehicle is performing road travel or work travel, the driver frequently forgets to operate a button or the like selecting between the road travel mode and work travel mode. In order to avoid this, another aspect of the present invention includes a travel status determiner determining whether the vehicle is in a work travel state or a road travel state based on a detection signal from a status detection sensor detecting a status of the work vehicle. When the travel status determiner determines that the vehicle is in the work travel state, the work travel mode is set. When the travel status determiner determines that the vehicle is in the road travel state, the road travel mode is set.

In another aspect of the present invention, in a case where a fixed speed change ratio mode is defined, the speed change ratio of the continuously variable transmission mechanism being fixed in the fixed speed change ratio mode, the vehicle speed controller is configured to adjust a number of revolutions of the engine based on the target speed. Accordingly, the speed can be changed while the continuously variable transmission mechanism is fixed at an appropriate speed change ratio, and acceleration or deceleration of the vehicle can be achieved based on engine revolutions (i.e., based on operation of an accelerator).

The fixed speed change ratio mode is often employed in specific travel conditions for a comparatively short period of time. Therefore, the fixed speed change ratio mode is preferably set by a simple operation that does not deviate much from normal operation by the driver. Therefore, in another aspect of the present invention, the speed change device is a multifunction lever operated by a hand of the driver, in which a speed change operation is assigned to a first operation function of the multifunction lever and setting the fixed speed change ratio mode is assigned to a second operation function of the multifunction lever.

In another aspect of the present invention, the braking device is a brake pedal, and when the brake pedal exceeds a predetermined amount of operation, a speed ratio relative to the maximum speed, which is used in determining the target speed, becomes 0%. According to this configuration, not only the braking force but also a drive speed supplied to drive wheels is adjusted by an amount of operation (depression amount) of the brake pedal, thus enabling highly accurate deceleration.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Before describing specific embodiments of a harvester according to the present invention, a procedural flow of basic speed change controls according to the present invention is described with reference to FIG. 1. A speed change device CSD and a braking device BD are provided to an exemplary speed change control device as operation devices operated by a driver. A speed change operation deflection is input using the speed change device CSD, and a braking operation deflection is input using the braking device BD. Based on a signal from a group of status detection sensors 90, when a traveling work vehicle is determined to be performing road travel, a maximum speed is set to a predetermined value (for example, 20 km/h) as a road travel mode; and when the traveling work vehicle is determined to be performing work travel, the maximum speed is set to a predetermined value (for example, 5 km/h) as a work travel mode (#01). The determination between road travel and work travel may be based on a signal from a switch operated directly by the driver, or may be inferred based on a status of an auxiliary speed change mechanism, a status of a PTO clutch, or the like. In addition, the maximum speed may also be input directly and defined using a direct maximum speed setter or the like.

When the speed change device CSD is operated, a target speed (represented by TS in FIG. 1) is derived from the speed change operation deflection (represented by d in FIG. 1) using a table or the like (#02). In the example shown in FIG. 1, the target speed is shown as a percentage of a speed range defined by a maximum speed. When the target speed is defined, a speed change ratio of a continuously variable transmission mechanism achieving the target speed is calculated by reference to a number of engine revolutions to produce a calculated speed change ratio. Thus, the real speed of a traveling work vehicle (actual speed) becomes substantially the target speed. In FIG. 1, a relationship between the speed range, the target speed, and the actual speed is expressed by horizontal bar graphs. A filled portion of the bar graph is the actual speed, whereas a white arrow is the target speed. By operating the speed change device CSD toward an upshift side or a downshift side, the target speed is changed toward acceleration or deceleration and, as a result, the actual speed increases or decreases.

Under such travel conditions, in a case where the driver wishes to perform a comparatively large deceleration that includes a stop, the driver operates the braking device BD. When the braking device BD is operated, a forcibly modified target speed (represented by TSx in FIG. 1) is derived from the braking operation deflection (represented by b in FIG. 1) using a table or the like (#03). The forcibly modified target speed temporarily overwrites and is used instead of the target speed calculated through operation of the speed change device CSD. Here, the forcibly modified target speed is calculated as a value dependent on an amount of braking operation deflection, and is shown as 5% in the figure. For a braking operation deflection that exceeds a threshold value, the forcibly modified target speed may also be calculated at 0% instead. Due to the forcibly modified target speed, a speed change status of the continuously variable transmission mechanism is either neutral or close to neutral.

When the vehicle body is decelerated close to a desired speed due to the above-described operation of the braking device BD, the driver operates the speed change device CSD in order to define the desired speed. The speed change operation deflection of the speed change device CSD at this stage is a trigger for a forced modification release process that cancels the forcibly modified target speed and correlates the newly calculated target speed with the actual speed at that point in time (#04). Through the forced modification release process, a speed change operation is achieved that originates with the actual speed of the work vehicle, and the driver is able to smoothly set the speed to a lower speed.

The braking device BD according to the present invention can include not only devices imparting a braking force directly to vehicle wheels, such as a brake pedal, but can also include devices exerting an indirect influence on the travel speed of the vehicle body, such as a clutch pedal or accelerator pedal. For example, when drive power to the vehicle wheels is interrupted by stepping on a clutch pedal and the vehicle body decelerates due to travel resistance, the target speed is changed to the forcibly modified target speed in the controls of the continuously variable transmission mechanism, as well. Moreover, the braking device BD according to the present invention can also include devices detecting a condition, such as a condition requiring that the work vehicle brake. An example of such a device is a switch detecting the presence or absence of the driver. In a case where the presence of the driver is no longer detected in the driver seat, the device can contribute to stopping the vehicle by setting the forcibly modified target speed in order to put the continuously variable transmission mechanism into neutral.

Figure 2:
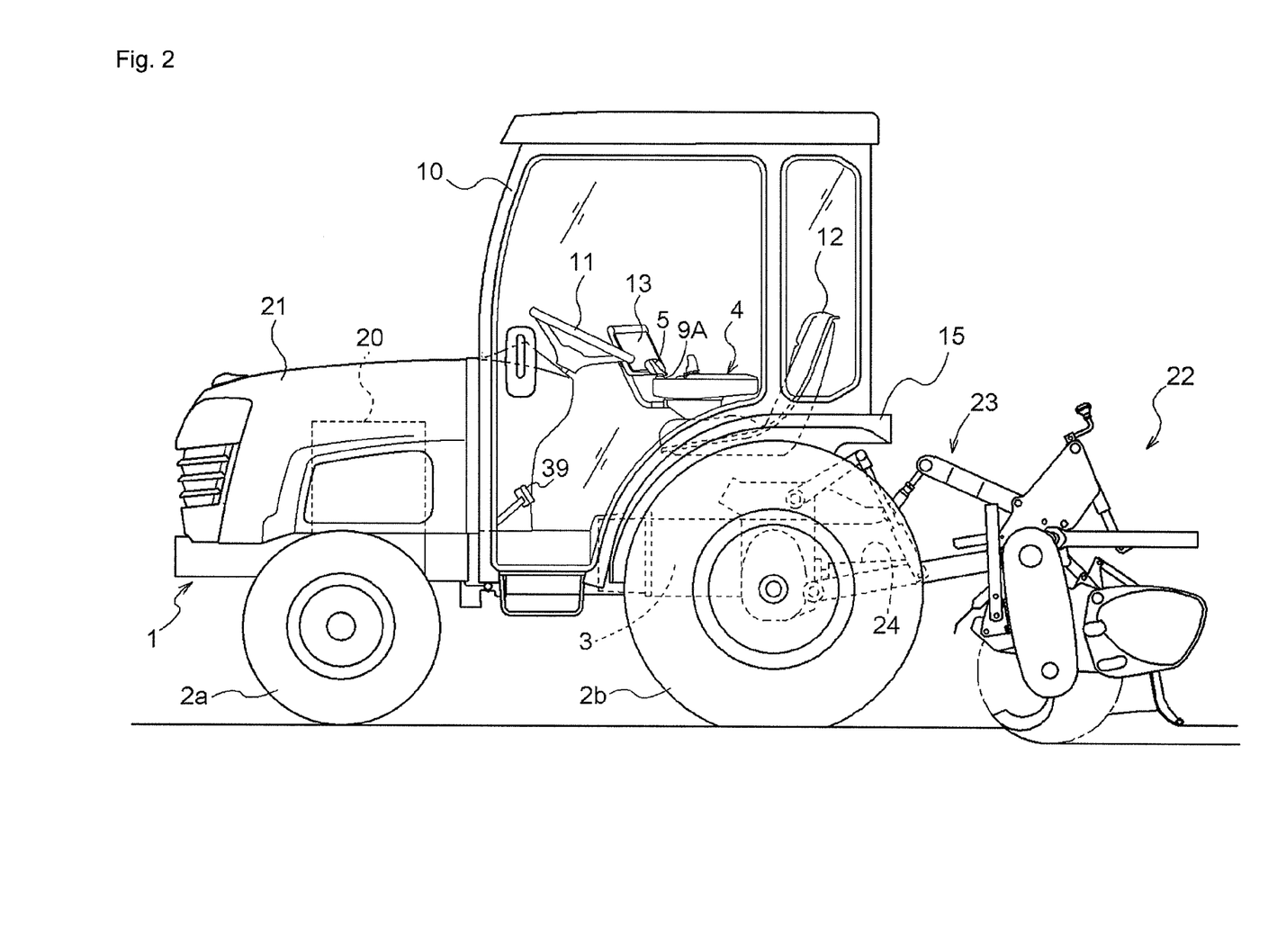
FIG. 2 is a lateral view of a tractor exemplary of a traveling work vehicle in which the speed change control device according to the present invention is installed.

Next, specific embodiments of a speed change control device according to the present invention are described. FIG. 2 is a lateral view of a tractor exemplary of a traveling work vehicle in which the speed change control device according to the present invention is installed. The tractor has a vehicle body 1 supported by front wheels 2a and rear wheels 2b, an engine 20 mounted in a front portion of the vehicle body 1, and a transmission 3 mounted rearward of the engine 20. A rotary tiller is mounted toward the rear of the vehicle body 1 as a ground work apparatus 22, the rotary tiller being mounted so as to be movable in a vertical direction via a lift mechanism 23. The tractor is a four-wheel-drive vehicle and drive force of the engine 20 is transmitted, via a speed change mechanism installed in the transmission 3, to the rear wheels 2b and front wheels 2a, which are capable of acting as drive wheels. Moreover, the drive power of the engine 20 is also transmitted to the ground work apparatus 22 via a PTO shaft 24, which projects rearward from the transmission 3. The engine 20 is covered by a hood 21. A cabin 10 is supported on the vehicle body 1 to the rear of the hood 21 and above the transmission 3.

An interior of the cabin 10 serves as a driver space, at a front portion of which is arranged a steering handle or wheel 11 steering the front wheels 2a and at a rear portion of which is arranged a driver seat 12, the driver seat 12 being positioned between a left-right pair of rear wheel fenders 15. An armrest operation device 4 having a multifunction operation tool 5 is provided spanning from a side of the driver seat 12 to a front side thereof. A display 13 visually notifying the driver of various information is provided forward of the armrest operation device 4. The display 13 is capable of input operation via a touchscreen panel 13A (see FIG. 4), and can receive various operation inputs from the driver. A brake pedal 39 is provided on a floor forward of the driver seat 12 as an exemplary braking device BD.

Figure 3:
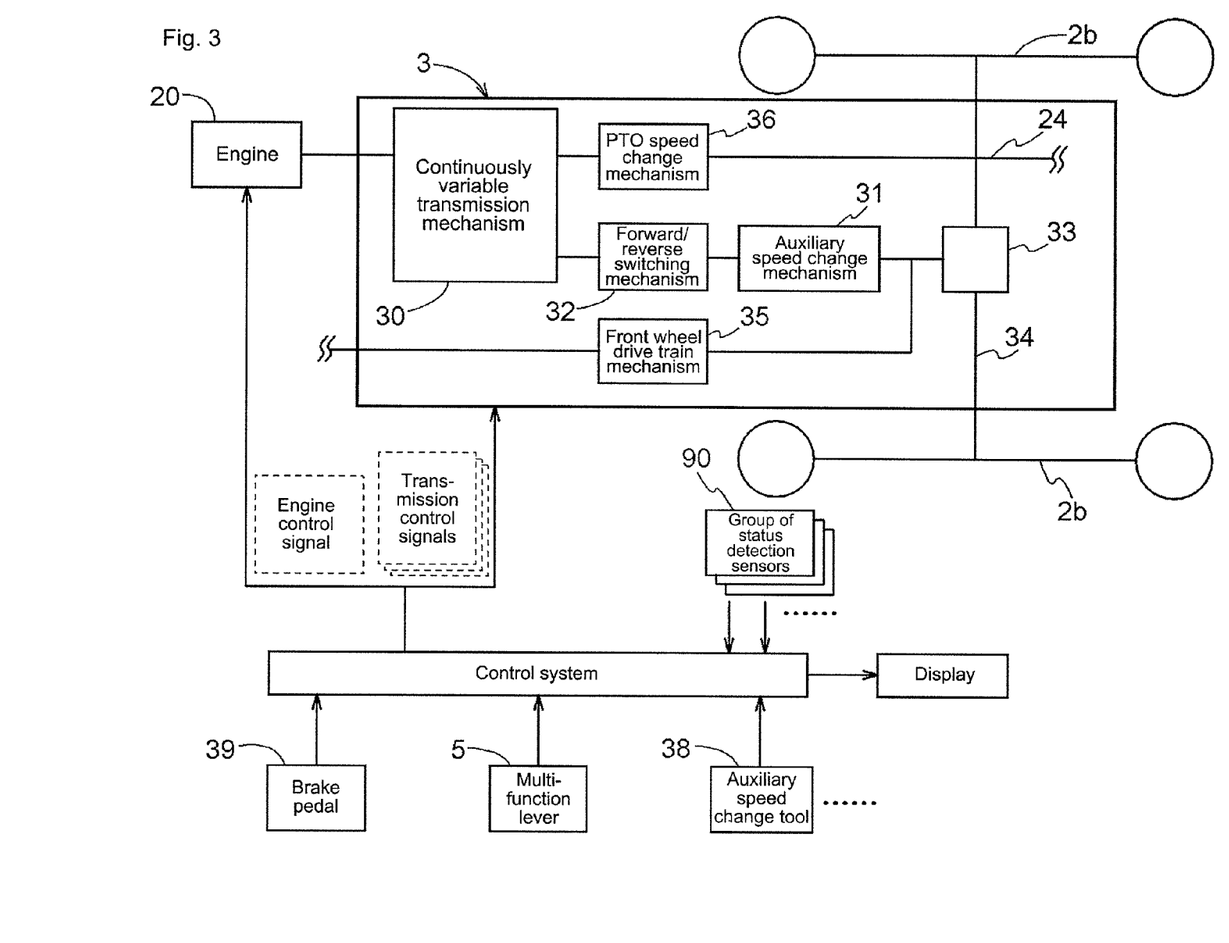
FIG. 3 is a schematic view of speed change control with respect to a transmission and an engine of the tractor.

As shown schematically in FIG. 3, the transmission 3 changes the speed of rotational drive power from the engine 20 and transmits the rotational drive power to the rear wheels 2b and front wheels 2a. The transmission 3 includes the continuously variable transmission mechanism 30, an auxiliary speed change mechanism 31, a forward/reverse travel switching mechanism 32, and a differential mechanism 33. The transmission 3 transmits speed-changed drive power to the rear wheels 2b via a rear wheel axle 34 extending from the differential mechanism 33. Moreover, the speed-changed drive power is also transmitted to the front wheels 2a via a front wheel drive train mechanism 35. The rotational drive power from the engine 20 is transmitted to the PTO shaft 24 via a PTO speed change mechanism 36 to drive the ground work apparatus 22, the PTO speed change mechanism 36 including a PTO clutch switching between transmitting and interrupting PTO drive power.

The continuously variable transmission mechanism 30 is a speed change mechanism which treats engine drive power as input, and which combines a hydrostatic speed change device (HST) with a planetary gear mechanism. The output of the continuously variable transmission mechanism 30 is switched between forward travel rotation and reverse travel rotation by the forward/reverse travel switching mechanism 32, and is additionally switched by the auxiliary speed change mechanism 31 between a high-speed region appropriate for the road travel mode and a low-speed region appropriate for the work travel mode. Accordingly, the tractor can continuously adjust the speed regardless of whether the tractor is performing road travel, work travel, forward travel, or reverse travel.

Figure 4:
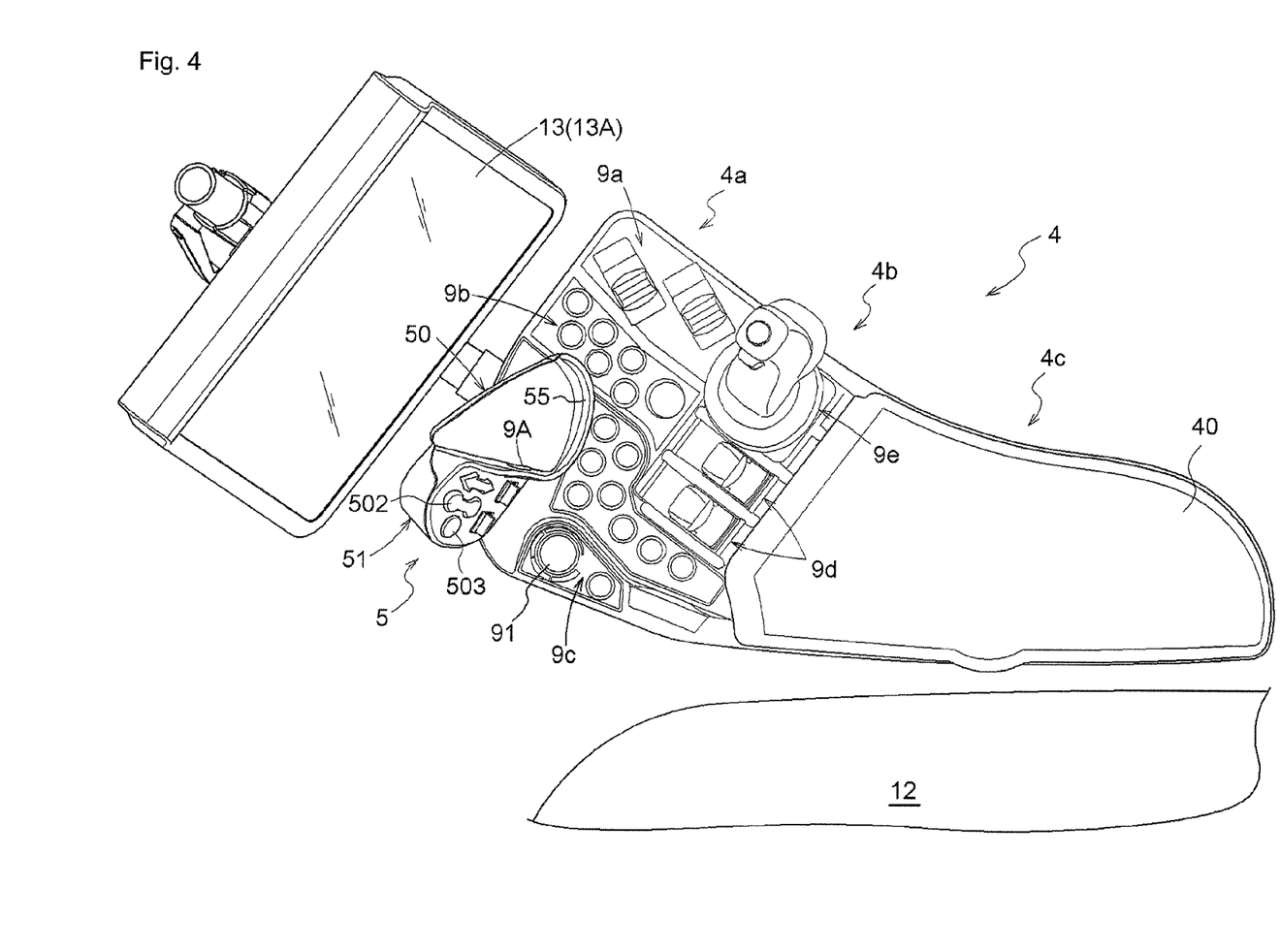
FIG. 4 is a top or plan view of an armrest operation device.

In order to operate the transmission 3, the multifunction operation tool 5 is arranged on the armrest operation device 4, the multifunction operation tool 5 serving as the speed change device CSD and as a forward/reverse travel switching operation tool, as described below. An auxiliary speed change tool 38 is also arranged on or in proximity to the armrest operation device 4. A control system of the tractor inputs an operation input signal (which is based on operation of the brake pedal 39, the multifunction operation tool 5, the auxiliary speed change tool 38, or the like) or a detection signal from the group of status detection sensors 90, which includes a speed sensor or the like, and outputs a transmission control signal to the transmission 3 and an engine control signal (in particular, an engine revolutions control signal) to the engine 20. In addition, screen data to display a travel status, such as a speed change status, on the display 13 is also output.

As can be understood from FIG. 4, the armrest operation device 4 can be divided into a front region 4a, a middle region 4b, and a rear region 4c in a plan view. A cushioning armrest bed 40 on which an arm is rested is provided to the rear region 4c. The multifunction operation tool 5, described in detail hereafter, is provided to substantially a left half of the front region 4a. A first operation switch group 9a and a second operation switch group 9b are provided as operation switch groups 9 to substantially a right half of the front region 4a. From the left, a third operation switch group 9c, a fourth operation switch group 9d, and a fifth operation switch group 9e are arranged as operation switch groups 9 on the middle region 4b. The operation switches provided to each of the operation switch groups 9 may have various forms such as a button, switch, dial, lever, joystick, or the like. In the present embodiment, examples of the switches according to the present invention may include, in the third operation switch group 9c, a mode selection button 9A selecting either the road travel mode or the work travel mode. In the present embodiment, a maximum speed is defined ahead of time for the defined road travel mode and work travel mode. Naturally, a maximum speed definition tool defining the maximum speed in each mode can also be assigned to one of the operation switch groups 9.

Figure 5:
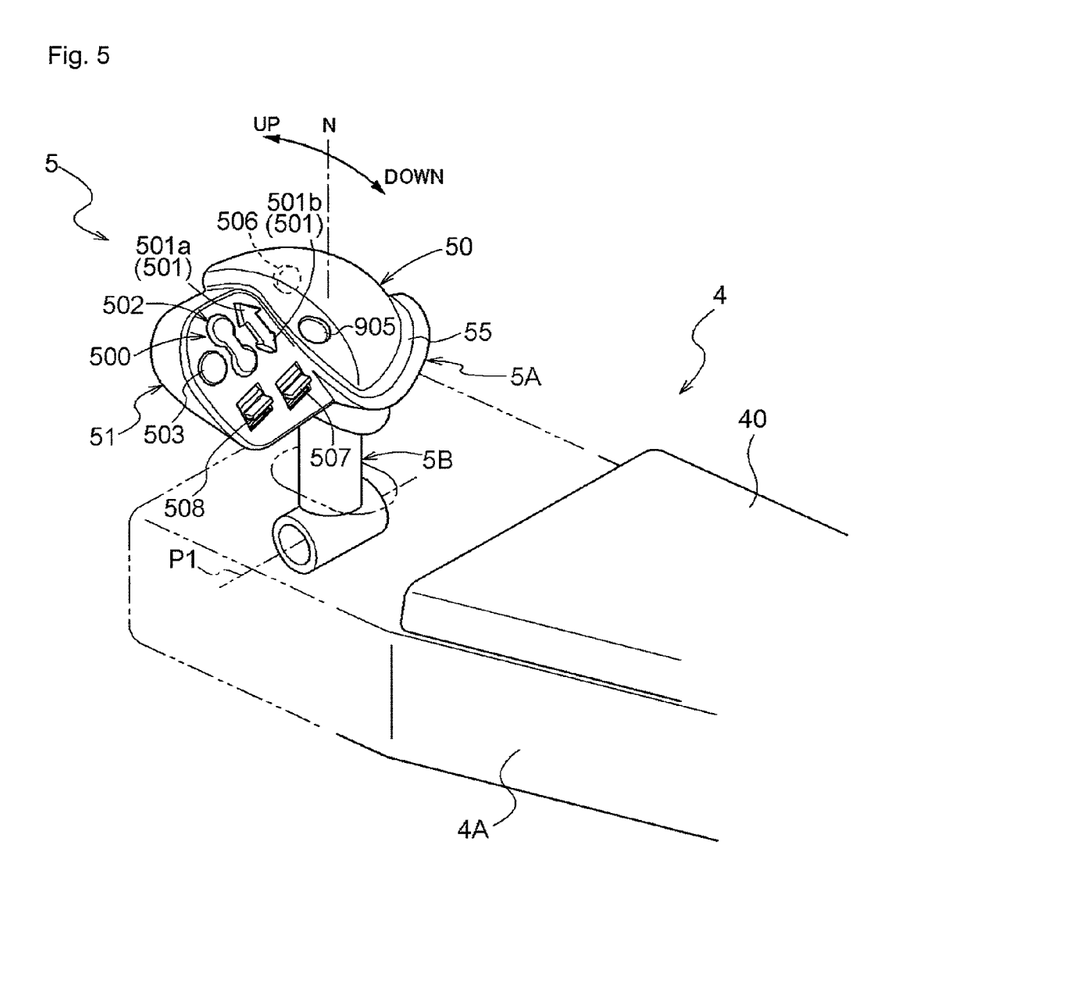
FIG. 5 is a perspective view of a multifunction operation tool provided to the armrest operation device.

As shown in FIGS. 4 and 5, the multifunction operation tool 5 is arranged at a front end region on the left side of the armrest bed 40 and is supported so as to be capable of pivoting around a pivot axis P1. The multifunction operation tool 5 is used to control a travel status of the tractor and a status of the ground work apparatus 22 mounted on the tractor. The multifunction operation tool 5 is substantially configured by a grip main body 5A and a pivoting body 5B. The pivoting body 5B is formed as an arm member pivoting around the pivot axis P1.

The grip main body 5A is provided on a free end side of the pivoting body 5B. As shown in FIG. 5, the grip main body 5A includes a grip portion 50 formed in a right-side region (here, substantially a right half region) and an elongated portion 51 formed in a left half region. A tab projecting outward is formed on at least a portion of a bottom edge of the grip portion 50 as a hypothenar rest 55.

A group of switches 500 capable of being operated by fingers of a hand holding the grip portion 50 is arranged on the grip main body 5A. The group of switches 500 includes, for example, a shuttle button 501, a speed change ratio fixing button 503, and a shuttle auxiliary button 506 (belonging to the operation switch group 9 related to travel), and a lift/lower button 502 and two hydraulic control switches 507 and 508 (belonging to the operation switch group 9 related to work). A speed change auxiliary button 505 and the shuttle auxiliary button 506 are arranged so as to be operable by an index or middle finger of the hand holding the grip portion 50, whereas other buttons are arranged so as to be operable by a thumb of the hand holding the grip portion 50.

Figure 1:
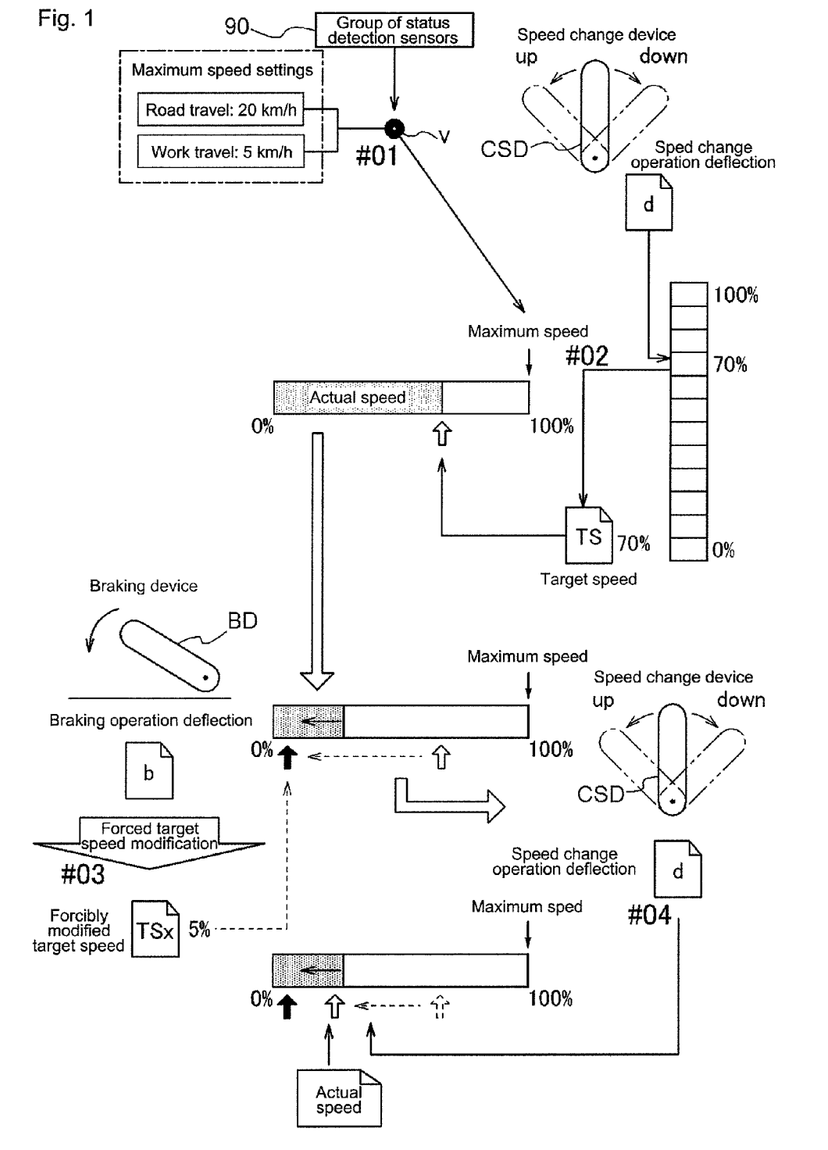
FIG. 1 is a schematic view illustrating a procedural flow of basic controls of a speed change control device according to the present invention.

The driver holds the grip portion 50 and, by moving the grip portion 50 in a front-back direction and causing the pivoting body 5B to pivot from a pivot-neutral position around the pivot axis P1, causes the speed change operation deflection described by FIG. 1, and this deflection signal is input to the control system. Specifically, by pivoting the grip portion 50 in a forward direction (P) from the pivot-neutral position (upshifting), the speed change ratio of the continuously variable transmission mechanism 30 is modified in an acceleration direction, whereas by pivoting the grip portion 50 in a rearward direction (D) (downshifting), the speed change ratio of the continuously variable transmission mechanism 30 is modified in a deceleration direction.

The auxiliary speed change tool 38 (see FIG. 3) switching between speed change stages of the auxiliary speed change mechanism 31 may be provided to the armrest bed 40 or in proximity thereto, and can also serve a dual purpose as the mode selection button 9A. In such a case, the auxiliary speed change mechanism 31 is switched to a higher speed stage by selection of the road travel mode, and is switched to a lower speed stage by selection of the work travel mode.

In the present embodiment, a speed change tool of the forward/reverse travel switching mechanism 32 is configured by the shuttle button 501 and the shuttle auxiliary button 506. By pressing the shuttle auxiliary button 506 and also pressing an upward-arrow portion 501a of the shuttle button 501, the forward/reverse travel switching mechanism 32 is switched to a forward travel state, whereas pressing the shuttle auxiliary button 506 and also pressing a downward-arrow portion 501b of the shuttle button 501 switches the forward/reverse travel switching mechanism 32 to a reverse travel state.

The lift/lower button 502 is a lift/lower tool lifting and lowering the ground work apparatus 22 (here, a tiller) via operations of the lift mechanism 23. By pressing an upper portion 502a of the lift/lower button 502, the ground work apparatus 22 rises, whereas pressing a lower portion 502b of the lift/lower button 502 lowers the ground work apparatus 22.

Figure 6:
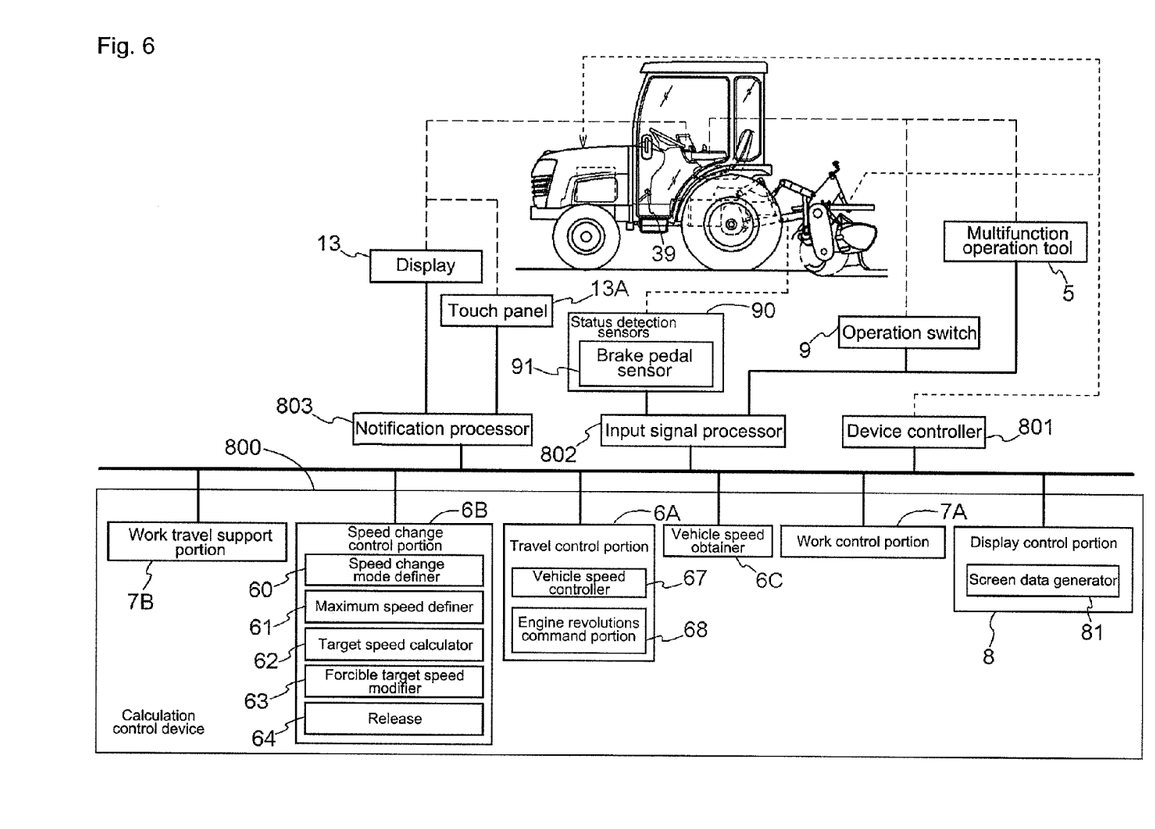
FIG. 6 is a functional block diagram of functions particularly related to the present invention in a control scheme provided to the tractor.

FIG. 6 illustrates the control system installed in the tractor, in the form of a functional block diagram. In the control system, functions achieved primarily by a computer program are represented as a calculation control device 800; however, this distinction is made purely for the purposes of description and the structure of an actual control system can be divided or consolidated as desired. The calculation control device 800 is connected to other portions by an in-vehicle LAN or the like so as to be capable of data transmission. Examples of such portions include a device controller 801, an input signal processor 802, a notification processor 803, and the like. In addition, various functions and portions within the calculation control device 800 are also connected by the in-vehicle LAN or some other data transmission path so as to be capable of data transmission.

The device controller 801 provides operation signals to various operation devices provided to the engine 20, the transmission 3, the ground work apparatus 22, and the like, controlling the operation thereof. The input signal processor 802 is an input interface, inputting signals from the multifunction operation tool 5, the operation switch groups 9, and the group of status detection sensors 90 and transferring the input signals to various portions of the control system. Moreover, the group of status detection sensors 90 includes the brake pedal sensor 91, which detects the braking operation deflection of the brake pedal 39. The notification processor 803 is an input/output interface, processing image signals output to the display 13, audio signals output to the speaker 14, or operation input signals from the touchscreen panel 13A.

The calculation control device 800 exemplified in FIG. 6 includes a travel control portion 6A, a speed change control portion 6B, a vehicle speed obtainer 6C, a work control portion 7A, a work travel support portion 7B, a display control portion 8, and the like.

In order to control the travel speed of the tractor continuously via the device controller 801, the travel control portion 6A generates a speed change control command for the continuously variable transmission mechanism 30, the auxiliary speed change mechanism 31, and the forward/reverse travel switching mechanism 32, which configure the transmission 3. In addition, because the travel speed is related to the engine revolutions, the travel control portion 6A issues a command to the engine 20 to increase or decrease rotation speed (number of revolutions per unit of time). The speed change control portion 6B calculates the target speed of the tractor, which is used when the travel control portion 6A generates the speed change command. When a vehicle speed sensor is included in the group of status detection sensors 90, the vehicle speed obtainer 6C obtains an actual vehicle speed based on a signal from the vehicle speed sensor. When the vehicle speed sensor is not included in the group of status detection sensors 90, the vehicle speed obtainer 6C can also obtain the actual vehicle speed based on a signal from another status detection sensor (such as number of engine revolutions or speed change ratio of the transmission 3).

The speed change control portion 6B employs a basic principle of continuous speed change control, which is described with reference to FIG. 1. The speed change control portion 6B is configured by a speed change mode definer 60, a maximum speed definer 61, a target speed calculator 62, a forcible target speed modifier 63, and a release 64. The speed change mode definer 60 sets either the road travel mode or the work travel mode based on a direct input from the driver, or based on a detection signal from the group of status detection sensors 90. The maximum speed definer 61 defines the maximum speed of the tractor in response to the travel mode defined by the speed change mode definer 60. The target speed calculator 62 determines the target speed, which is the speed to be achieved by the tractor, based on a pivot operation (upshift or downshift) of the multifunction operation tool 5 as the speed change operation tool. The target speed is calculated as a speed ratio relative to a range of speed from the maximum speed defined by the maximum speed definer 61 to zero speed. The forcible target speed modifier 63 forcibly modifies the target speed calculated by the target speed calculator 62 to a lower speed temporarily based on the operation deflection of the brake pedal 39. The release 64 treats an operation of the multifunction operation tool 5 as the speed change tool as a trigger and cancels the forced modification of the target speed temporarily enacted by the forcible target speed modifier 63, and defines a target speed corresponding to the actual vehicle speed obtained by the vehicle speed obtainer 6C as the new target speed.

The travel control portion 6A includes a vehicle speed controller 67 and an engine revolutions command portion 68. The vehicle speed controller 67 generates a control command adjusting one or both of the number of revolutions of the engine 20 and the speed change ratio of the continuously variable transmission mechanism 30 based on the target vehicle speed calculated by the speed change control portion 6B, and outputs the control command to the device controller 801. In a case where a modification to the engine revolutions is required when modifying the tractor speed, the engine revolutions command portion 68 generates an engine revolutions command and outputs the command to the device controller 801. The engine revolutions command portion 68 also generates an appropriate engine revolutions command and outputs the command to the device controller 801 when a mode modifying the tractor speed is defined where the speed change ratio of the continuously variable transmission mechanism 30 is fixed, or conversely when a mode modifying the speed change ratio of the continuously variable transmission mechanism 30 is defined where the tractor speed has been fixed.

The work travel support portion 7B manages guidance, warnings, and the like, as well as notifications to the driver, based on partial automation of the work travel or on signals from the group of status detection sensors 900.

The work control portion 7A controls the lift mechanism 23 and the ground work apparatus 22 based on signals from the work-related operation buttons on the multifunction operation tool 5 and signals from the work-related operation switch groups 9.

Figure 7:
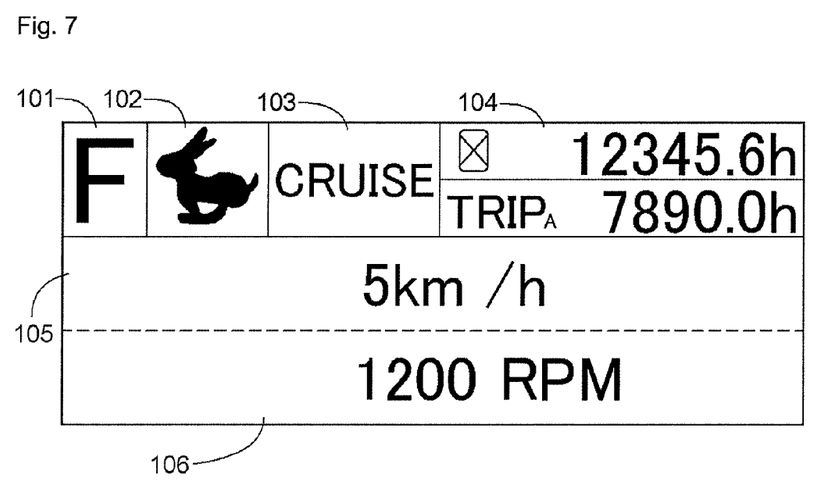
FIG. 7 is a screen image of an exemplary speed change control screen displayed on a display.

The display control portion 8 includes a screen data generator 81. Screen data generated by the screen data generator 81 is sent to the notification processor 803, and thus a desired screen is displayed on the display 13. FIG. 7 illustrates a speed change control screen displaying parameters of the speed change control.

A first area 101, second area 102, third area 103, and fourth area 104 are aligned laterally in an upper portion of the speed change control screen shown in FIG. 7, while a fifth area 105 and a sixth area 106 are arranged vertically in a lower portion of the speed change control screen. The first area 101 displays a status of the forward/reverse travel switching mechanism 32 (here, "F" indicating forward travel). The second area 102 displays a status of the auxiliary speed change mechanism 31 (here, a drawing of a rabbit indicating a high speed stage). The third area 103 displays a signal indicating an ON/OFF status of cruise travel. The fourth area 104 displays a selection from among time, engine usage time, travel distance, and the like. The fifth area 105 displays the travel speed. The sixth area 106 displays the engine revolutions.

Other Embodiments (1) The speed change device CSD may be a lever-type or pedal-type device, rather than the multifunction operation tool 5 as described above.

(2) The braking device BD may be a device other than the brake pedal 39 that operates a mechanism imparting a braking force to travel of the work vehicle (such as a side clutch, for example).

(3) The display 13 may be arranged at a location other than the armrest operation device 4. In addition, a plurality of the displays 13 may be included, which may be configured so as to mirror each other.

(4) The functional blocks illustrated in FIG. 6 are presented merely for the purposes of description, and the various portions may be consolidated or divided as desired. In particular, the various portions configuring the calculation control device 800 are linked to each other by software, and therefore in many practical cases duplication of these portions is common. The present invention is not limited to the divisions illustrated in FIG. 6.

In addition to a tractor, the traveling work vehicle according to the present invention may also be applied to an agricultural work vehicle such as a rice transplanter or combine, or to a construction and engineering vehicle such as a front loader.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A speed control device in a traveling work vehicle, the speed control device changing a speed of rotational drive power from an engine to drive vehicle wheels and comprising:

a speed change device;

a maximum speed definer defining a maximum speed of the traveling work vehicle;
a target speed calculator determining a target speed, based on operation movement or position of the speed change device;
a vehicle speed controller adjusting or changing at least one of:
  engine revolutions; and/or
  a speed change ratio;
a vehicle speed obtainer obtaining an actual speed of the traveling work vehicle;
a braking device that is different and distinct from the speed change device and that is configured to brake the traveling work vehicle;
a forcible target speed modifier forcibly modifying the target speed to a lower speed based on operation or movement of the braking device; and
a release operable to treat an operation of the speed change device as a trigger to cancel the target speed forcibly modified by the forcible target speed modifier, and conform the target speed to the actual vehicle speed.

2. The speed control device according to claim 1, wherein the rotational drive power from the engine occurs via a continuously variable transmission mechanism.

3. The speed control device according to claim 1, wherein the target speed calculator calculating a speed ratio relative to the maximum speed defined by the maximum speed definer.

4. The speed control device according to claim 1, wherein the vehicle speed controller adjusts or changes the speed change ratio, wherein the traveling work vehicle includes a continuously variable transmission mechanism and wherein the speed change ratio is a speed change ratio of the continuously variable transmission mechanism.

5. The speed control device according to claim 1, wherein the maximum speed is at least one of:
  a work travel mode maximum speed;
  a road travel mode maximum speed having a higher speed than the work travel mode maximum speed; and/or
  a work travel mode maximum speed operating during a road travel mode.

6. The speed control device according to claim 5, further comprising:
  a travel status determiner determining whether the traveling work vehicle is in a work travel state or a road travel state based on a detection signal from a status detection sensor detecting a status of the work vehicle.

7. The speed control device according to claim 5, wherein the work travel mode is set or activated when a travel status determiner determines that the traveling work vehicle is in the work travel state, and the road travel mode is set or activated when the travel status determiner determines that the vehicle is in the road travel state.

8. The speed control device according to claim 7, wherein, when a fixed speed change ratio mode is activated, the speed change ratio assumes a fixed speed change ratio mode, and the vehicle speed controller adjusts the engine revolutions of the engine based on the target speed.

9. The speed control device according to claim 5, wherein, when a fixed speed change ratio mode is activated, the speed change ratio assumes a fixed speed change ratio mode, and the vehicle speed controller adjusts the engine revolutions of the engine based on the target speed.

10. The speed control device according to claim 1, wherein, when a fixed speed change ratio mode is activated, the speed change ratio assumes a fixed speed change ratio mode, and the vehicle speed controller adjusts the engine revolutions of the engine based on the target speed.

11. The speed control device according to claim 10, wherein the speed change device is a multifunction lever that is hand and/or driver operable.

12. The speed control device according to claim 10, wherein the speed change device is settable in each of:
  a first operation function activating a speed change operation; and
  a second operation function activating the fixed speed change ratio mode.

13. The speed control device according to claim 12, wherein the speed change device is a multifunction lever that is hand and/or driver operable.

14. The speed control device according to claim 1, wherein the braking device is a brake pedal, such that movement of the brake pedal beyond a predetermined amount, the target speed is modified to become no speed or a zero-percent speed.

15. A speed control device in a traveling work vehicle, the speed control device changing a speed of rotational drive power from an engine to drive vehicle wheels and comprising:
  a user hand operable speed change device;
  a user foot operable braking device configured to brake the traveling work vehicle;
  a control system configured to each of:
    receive an input signal from the braking device;
    define or set a maximum speed of the traveling work vehicle;
    determine or set a target speed based on operation movement or position of the speed change device;
    change or adjust at least one of:
      engine speed;
      transmission output speed; and/or
      a transmission speed change ratio;
    obtain or determine an actual speed of the traveling work vehicle; and
    lower the target speed based on operation or movement of the braking device,
  wherein the target speed is configured to be modified by a forcible target speed modifier, and the control system is further configured to treat an operation of the speed change device as a trigger to cancel the target speed forcibly modified by the forcible target speed modifier, and conform the target speed to the actual vehicle speed.

16. The speed control device according to claim 15, wherein the braking device comprises a brake pedal sensor that outputs the input signal to the control system.

17. A speed control device in a traveling work vehicle, the speed control device changing a speed of rotational drive power from an engine to drive vehicle wheels and comprising:
  a user operable speed change device;
  a braking device that is different and distinct from the speed change device and that is configured to brake the traveling work vehicle;
  a control system configured to each of:
    define and/or set a maximum speed of the traveling work vehicle;
    determine and/or set a target speed based on operation movement or position of the speed change device;
    change or adjust at least one of:
      engine speed;
      transmission output speed; and/or
      a transmission speed change ratio;

obtain or determine an actual speed of the traveling work vehicle; and automatically change the target speed based on operation or movement of the braking device, wherein the target speed is configured to be modified by a forcible target speed modifier, and the control system is further configured to treat an operation of the speed change device as a trigger to cancel the target speed forcibly modified by the forcible target speed modifier, and conform the target speed to the actual vehicle speed.

18. The speed control device according to claim 17, wherein the braking device comprises a brake pedal and a brake pedal sensor, and the control system receives an input signal from the brake pedal sensor.

* * * * *